(12) United States Patent
Loh

(10) Patent No.: US 9,888,160 B2
(45) Date of Patent: *Feb. 6, 2018

(54) INTELLIGENT RECYCLING CONTAINER

(71) Applicant: International Business Machines Corporation, Armonk, NY (US)

(72) Inventor: Hoong Sheng Loh, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,280

(22) Filed: Oct. 1, 2015

(65) Prior Publication Data

US 2016/0021287 A1    Jan. 21, 2016

Related U.S. Application Data

(63) Continuation of application No. 14/291,896, filed on May 30, 2014.

(51) Int. Cl.
| | |
|---|---|
| H04N 7/18 | (2006.01) |
| H04N 9/47 | (2006.01) |
| H04N 5/225 | (2006.01) |
| H04W 4/06 | (2009.01) |
| H04N 1/00 | (2006.01) |

(Continued)

(52) U.S. Cl.
CPC .............. *H04N 5/2257* (2013.01); *B65F 1/02* (2013.01); *G06F 3/0412* (2013.01); *H04N 1/00278* (2013.01); *H04N 7/183* (2013.01); *H04W 4/06* (2013.01); *B65F 2210/128* (2013.01); *B65F 2210/138* (2013.01); *B65F 2210/152* (2013.01);

(Continued)

(58) Field of Classification Search
None
See application file for complete search history.

(56) References Cited

U.S. PATENT DOCUMENTS 5,278,914 A  *  1/1994  Kinoshita ................ H04N 7/18
                                                               348/94
2003/0059090 A1*  3/2003  Zhang .................. G01N 21/8851
                                                               382/110

(Continued)

FOREIGN PATENT DOCUMENTS

CN          202548962 U     11/2012
CN          202594215 U     12/2012

OTHER PUBLICATIONS

Appendix P—List of IBM Patents or Patent Applications Treated as Related.

(Continued)

*Primary Examiner* — Talha M Nawaz
(74) *Attorney, Agent, or Firm* — Gilbert Harmon, Jr.

(57) ABSTRACT

In an embodiment, a refuse container comprises a camera in electrical communication with a computing processor that is included in one or more computer processors. A radio is in electrical communication with a computing processor that is included in the one or more computer processors having the ability to transmit and/or receive data wirelessly. The digital camera is positioned relative to an included refuse collection point in a manner that allows one or more of an image of a refuse item to be captured as the refuse item enters the refuse collection point and an image of a recycler as the refuse item crosses the aperture threshold.

11 Claims, 3 Drawing Sheets

(51) Int. Cl.
*B65F 1/02* (2006.01)
*G06F 3/041* (2006.01)

(52) U.S. Cl.
CPC .... *B65F 2210/168* (2013.01); *G06K 2209/25* (2013.01)

(56) References Cited

U.S. PATENT DOCUMENTS

| | | | | |
|---|---|---|---|---|
| 2003/0085266 | A1* | 5/2003 | Simon | A47G 29/1207 232/27 |
| 2005/0217076 | A1* | 10/2005 | Gvili | D01B 1/04 19/40 |
| 2007/0128899 | A1* | 6/2007 | Mayer | G06F 9/4406 439/152 |
| 2007/0226088 | A1* | 9/2007 | Miles | G06Q 10/08 705/28 |
| 2008/0154751 | A1* | 6/2008 | Miles | G06Q 10/06 705/28 |
| 2009/0161907 | A1* | 6/2009 | Healey | B65F 1/14 382/100 |
| 2011/0145173 | A1 | 6/2011 | Hunscher et al. | |
| 2011/0225098 | A1 | 9/2011 | Wolff et al. | |
| 2012/0029985 | A1 | 2/2012 | Wilson et al. | |
| 2013/0144428 | A1* | 6/2013 | Irwin | B65G 1/0485 700/218 |
| 2013/0226679 | A1 | 8/2013 | Bowles | |
| 2013/0304529 | A1* | 11/2013 | Phalake | G06Q 10/06 705/7.11 |
| 2015/0144012 | A1* | 5/2015 | Frybarger | G06Q 30/0241 100/102 |
| 2015/0307273 | A1* | 10/2015 | Lyman | G01G 19/08 705/7.13 |
| 2015/0371187 | A1* | 12/2015 | Irwin | G06Q 10/0836 705/72 |
| 2016/0138859 | A1* | 5/2016 | Stimpfig | F25D 27/005 62/125 |

OTHER PUBLICATIONS

IBM, "Smart Recycle Bin", An IP.com Prior Art Database Technical Disclosure, IPCOM000183039D, Publication Date May 12, 2009, <http://ip.com/IPCOM/000183039>.

Islam, et al., "Overview for Solid Waste Bin Monitoring and Collection System", 2012 International Conference on Innovation, Management and Technology Research, May 2012, <http://ieeexplore.ieee.org/xpl/articleDetails.jsp?arnumber=6236399>.

Loh, Hoong Sheng, "Intelligent Recycling Container", U.S. Appl. No. 14/291,896, filed May 30, 2014.

Ray Wang, "Advertisers' New Best Friend: "Smart" Recycling Bins", Smartt, Aug. 13, 2013, <http://www.smartt.com/insights/advertisers%E2%80%99-new-friend-%E2%80%9Csmart%E2%80%9D-recycling-bins>.

\* cited by examiner

INTELLIGENT RECYCLING CONTAINER

BACKGROUND

The present disclosure relates generally to the field of refuse recycling, and more particularly to an intelligent refuse container. Recycling is a process to change refuse materials into new products to prevent waste of potentially useful materials, reduce the consumption of fresh raw materials, reduce energy usage, reduce air pollution and water pollution by reducing the need for conventional waste disposal, and lower greenhouse gas emissions.

SUMMARY

In an embodiment, a refuse container comprises a camera in electrical communication with a computing processor that is included in one or more computer processors. A radio is in electrical communication with a computing processor that is included in the one or more computer processors having the ability to transmit and/or receive data wirelessly. The digital camera is positioned relative to an included refuse collection point in a manner that allows one or more of an image of a refuse item to be captured as the refuse item enters the refuse collection point and an image of a recycler as the refuse item crosses the aperture threshold.

DETAILED DESCRIPTION

Figure 1:
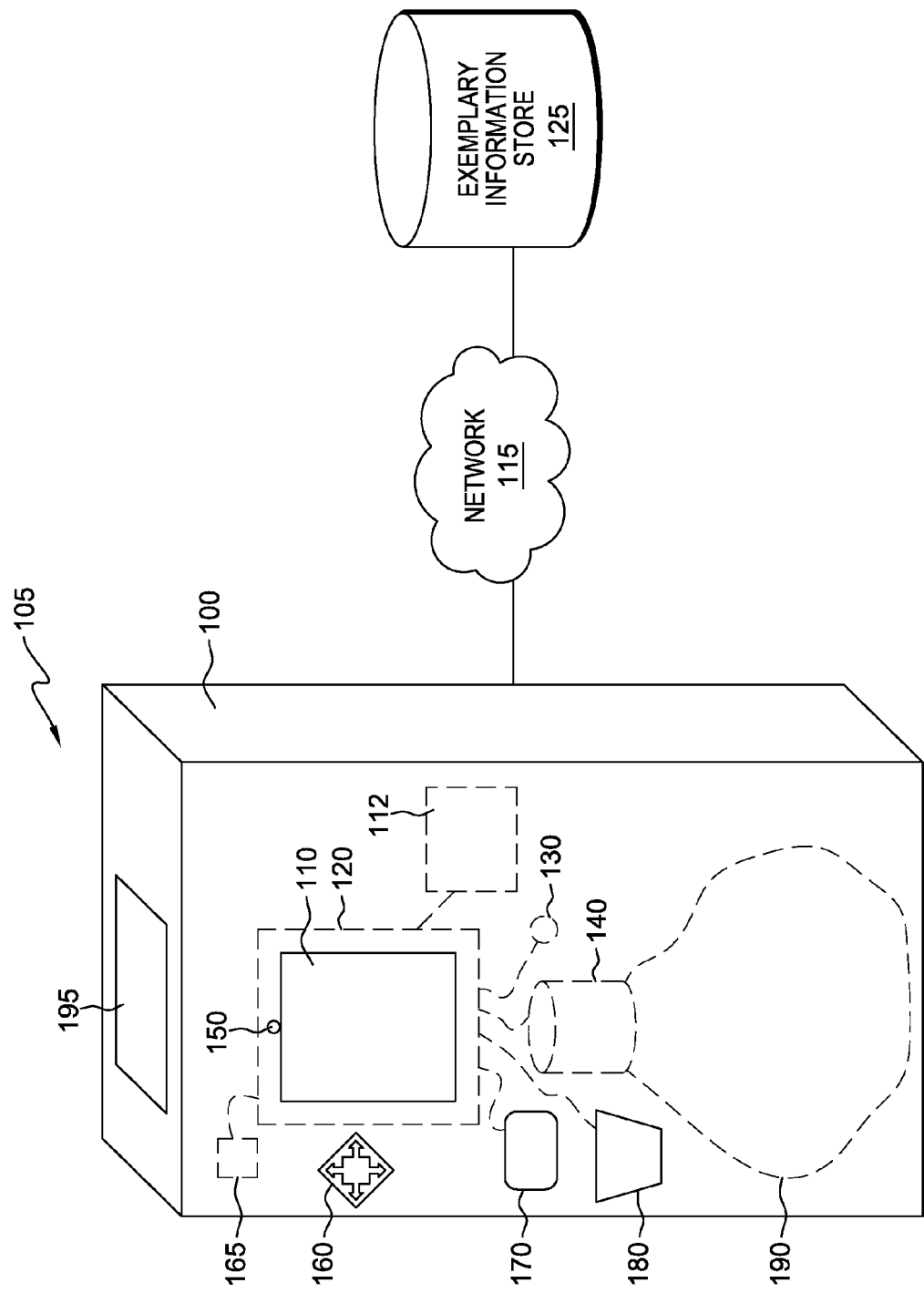
FIG. 1 is a perspective diagram of a refuse container, in accordance with an embodiment of the present invention.
Figure 2:
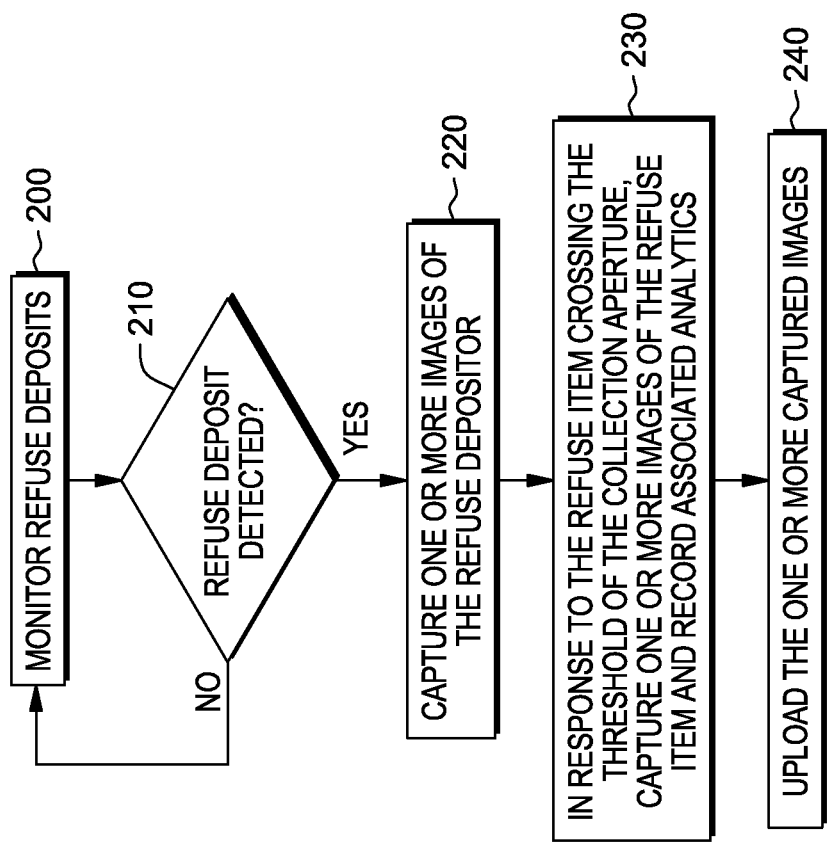
FIG. 2 is a flowchart depicting the operational steps of a program function, within the environment of FIG. 1, in accordance with an embodiment of the present invention.
Figure 3:
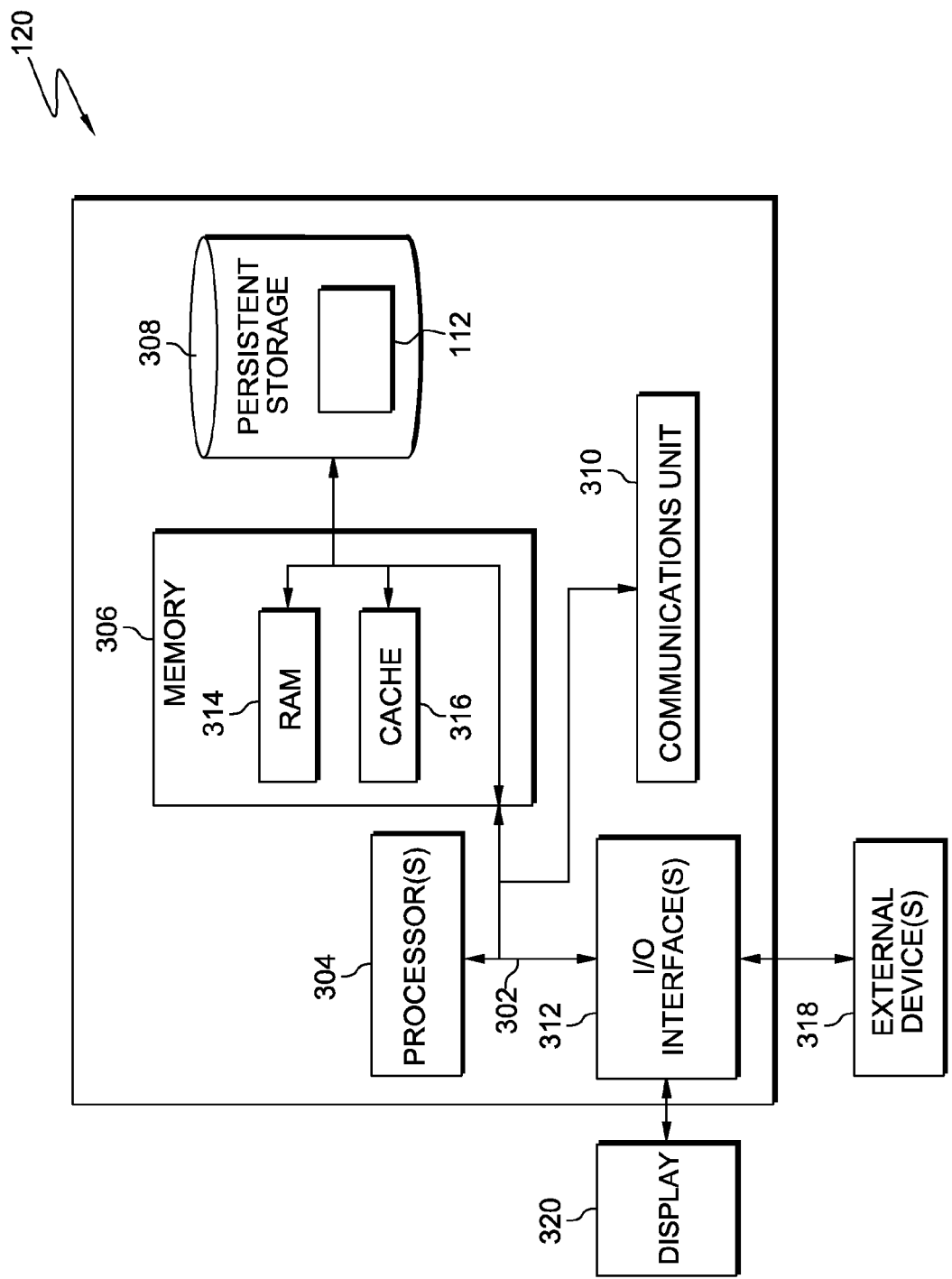
FIG. 3 depicts a block diagram of components of a computing device executing the program function, in accordance with an embodiment of the present invention.

With reference now to FIGS. 1-3.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be an apparatus and/or a method. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Recycling is a process to change refuse items into new products to prevent waste of potentially useful materials, reduce the consumption of fresh raw materials, reduce energy usage, reduce air pollution and water pollution by reducing the need for conventional waste disposal, and lower greenhouse gas emissions. Certain aspects of the present invention seek to provide an intelligent refuse container that encourages recycling and generates information associated with deposited refuse items. In other embodiments, recycling is encouraged by providing a means for the refuse depositor (depositor) to interact with the intelligent refuse container. In an embodiment, opportunities for such interactions are provided by a display, card reader, and/or photo printer. Embodiments of the present invention will now be described in detail with reference to the Figures. FIG. 1 is a block diagram illustrating an environment, generally designated 105, in accordance with an embodiment of the present invention. Environment 105 includes exemplary information store 125 and refuse container 100, all interconnected over network 115.

Network 115 can be, for example, a local area network (LAN), a wide area network (WAN) such as the Internet, or a combination of the two, and can include wired, wireless, or fiber optic connections. Network 115 may be a distributed computing environment utilizing clustered computers and components that act as a single pool of seamless resources, as is common in data centers and with cloud computing applications or "clouds". In general, network 115 can be any combination of connections and protocols that will support communications between refuse container 100 and exemplary information store 125. Exemplary information store 125 is an information repository that stores information transmitted by refuse container 100, in accordance with an embodiment of the present invention.

In an embodiment, exemplary information store 125 is utilized to store analytics, such as refuse item/recycling analytics and marketing analytics. Refuse container 100 is an intelligent refuse collection point that encourages recycling by providing depositors an opportunity to interact with the refuse collection point. In certain embodiments, refuse container 100 comprises display 110, computing device 120, cameras 130 and 150, collection aperture 140, card readers 160 and 170, printer 180, refuse bag 190, radio 165, and orifice 195. Radio 165 may be positioned on a surface of refuse container 100. In an embodiment, radio 165 utilizes an ultra high frequency (UHF) signal to transmit and/or receive data. In other embodiments, radio 165 utilizes a microwave band signal to transmit and/or receive data. The operations exhibited by refuse container 100 are under the control of computing device 120. In various embodiments of the present invention, computing device 120 may be a laptop computer, a tablet computer, a netbook computer, a personal computer (PC), a desktop computer, a personal digital assistant (PDA), a smart phone, or any programmable electronic device capable of communicating via radio 165. Computing device 120 may include internal and external hardware components, as depicted and described in further detail with respect to FIG. 3.

In an embodiment, computing device 120 is in electrical communication with collection aperture 140, cameras 130 and 150, radio 165, card readers 160 and 170, as well as printer 180. Refuse is deposited in refuse container 100 via orifice 195, which is positioned on the top surface of refuse container 100. In an embodiment, orifice 195 is formed through a side surface of refuse container 100 accessible to depositors. Camera 150 is positioned on a surface of refuse container 100 in a manner that facilitates the capture of images of depositors, such as a surface exposed to the depositor. Camera 150 is a digital camera that captures images of depositors.

In an embodiment, in response to the deposition of a refuse item into orifice 195, camera 150 captures an image of the depositor and transmits the captured image to computing device 120. Collection aperture 140 is a device that detects the traversal of refuse items across its threshold, in accordance with an embodiment of the present invention. Collection aperture 140 is positioned within refuse container 100 adjacent to refuse bag 190. In an embodiment, refuse bag 190 is comprised of recycled and/or recyclable material. Collection aperture 140 senses when a refuse item traverses collection aperture 140 and notifies computing device 120 thereof. Camera 130 is a digital camera that is positioned within refuse container 100 proximate to collection aperture 140 in a manner that allows camera 130 an opportunity to capture images of the deposited refuse items. Card reader 160 is positioned at least partially on a surface of refuse container 100 accessible to depositors. Card reader 160 reads and/or writes data to memory objects, such as memory cards and memory sticks.

Printer 180 is positioned at least partially on a surface of refuse container 100 that is accessible to depositors. Printer 180 generates color and/or black-and-white print outs. Printer 180 generates print outs of images captured by camera 150 and/or camera 130. Printer 180 can generate print outs of images stored on memory objects, such as memory sticks and memory cards, read by card reader 160. Printer 180 can utilize soy ink to generate print outs. Soy ink is a type of ink made from soybeans and is more environmentally friendly than traditional petroleum-based inks. The use of soy ink can facilitate the recycling of paper because soy ink can be more easily removed than regular ink from paper during the de-inking process. Card reader 170 is positioned at least partially on a surface of refuse container 100 that is accessible to refuse depositors. Card reader 170 is capable of reading data from cards having barcodes, magnetic strips, biometric information, Wiegand card technology, an integrated circuit, and/or flash memory. In an embodiment, card reader 170 reads payment cards. In certain embodiments, refuse container 100 allows depositors to contribute monetarily to one or more predetermined charities using card reader 170. For example, display 110 can display predetermined charities to a depositor, and using card reader 170 the depositor can use their payment card and make a monetary donation to one of the predetermined displays. Providing an opportunity for depositors to make charitable donations can increase their usage of refuse container 100.

Display 110 is positioned at least partially on a surface of refuse container 100 that is accessible to depositors. Although display 110 is depicted as being positioned proximate to computing device 120, display 110 may be positioned distal thereto or any surface of refuse container 100 that is accessible to depositors. In certain embodiments, display 110 is a touch screen display that allows depositors to interact with one or more predetermined applications, such as applications that allow depositors to make monetary donations to charities. Alternative embodiments of refuse container 100 may comprise fewer components than depicted in FIG. 1. In a first embodiment, refuse container 100 comprises orifice 195, computing device 120, cameras 150 and 130, collection aperture 140, radio 165, and refuse bag 190.

In a second embodiment, refuse container 100 further comprises display 110 in addition to the components comprising the first embodiment. In a third embodiment, refuse container 100 further comprises card reader 160 and/or card reader 170 in addition to the components comprising the first and/or second embodiment. In a fourth embodiment, refuse container 100 may comprise printer 180 in addition to the components comprised in one or more of the first, second, and third embodiments. Program function 112 monitors refuse deposits that are associated with refuse container 100. Program function 112 can identify a user by their picture, for example, a pictured captured by program function 112. Program function 112 can process monetary transactions. Program function 112 can generate analytics that reflect refuse type, refuse depositor, and/or location. Program function 112 can capture image of refuse items. Program function 112 can allow a user to make a monetary donation to a charity of their choice or a predetermined charity. Program function 112 can print captured images.

FIG. 2 is a flowchart depicting operational steps of program function 112, in accordance with an embodiment of the present invention.

Program function 112 monitors refuse deposits occurring within orifice 195 (step 200). If program function 112 determines there are no deposits occurring within orifice 195 ("no" branch decisional 210), then program function 112 returns to step 200. If program function 112 determines that a refuse deposit has occurred in orifice 195 ("yes" branch decisional 210), then program function 112 captures one or more images of the depositor (step 220). For example, Watson, a university student, consumes a popular energy drink in a plastic bottle and disposes of plastic bottle in refuse container 100, which is located at the sports center of the university attended by Watson. In response to program function 112 detecting the deposition of the plastic bottle within orifice 195, the program function 112 captures one or more images of Watson using camera 130.

In an embodiment, program function 112 identifies and/or verifies the identification of Watson utilizing the one or more captured images. In an embodiment, program function 112 identifies and/or verifies the identification of depositors using information received from the depositors during a prior use of refuse container 100. For example, during a prior usage of refuse container 100, Watson provided his name using display 110, which program function 112 associated with any concomitantly captured images. Subsequent to the plastic bottle traversing orifice 195, it traverses collection aperture 140. In response to the refuse item traversing the threshold of collection aperture 140, program function 112 captures one or more images of the refuse item and records associated information (step 230). Program function 112 uploads the captured images (step 240).

For example, in response to the plastic bottle traversing the threshold of collection aperture 140, program function 112 utilizes camera 130 to capture one or more images of the plastic bottle. Program function 112 determines that the label affixed to the plastic bottle identifies it as EnergyDrink XYZ. Subsequently, program function 112 stores information associated with Watson's deposit. In an embodiment, program function 112 generates recycling analytics. For example, the recycling analytics includes one or more of a depositorID, time, date, refuse itemID, refuse item material type, and location of refuse container 100. Refuse item material type includes, for example, plastic, aluminum, and/or glass. The ability to identify a refuse item material type can provide information on the types of refuse items that are consumed at a particular location or venue, which can allow for the tailoring of associated marketing efforts. In an embodiment, camera 130 utilizes high-speed photography to capture images of refuse items. Cameras that utilize high-speed photography technology have a capture rate of at least 120 frames per second. The use of high-speed photography can reduce the chances of capturing blurred images. In other embodiments, program function 112 utilizes optical character recognition to convert captured images of text into characters. In certain embodiments, program function 112 utilizes digital image processing and/or image segmentation to identify refuse items and/or depositors.

FIG. 3 depicts a block diagram of components of computing device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A non-transitory computer readable storage medium embodiment herein is readable by a computerized device. The non-transitory computer readable storage medium stores instructions executable by the computerized device to perform a method that tests integrated circuit devices to measure a voltage overshoot condition.

Computing device 120 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Program function 112 is stored in persistent storage 308 for execution by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program function 112 may be downloaded to persistent storage 308 through communications unit 310.

I/O interface(s) 312 allows for input and output of data with other devices that may be connected to computing device 112. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data used to practice embodiments of the present invention, e.g., program function 112, can be stored on such portable computer readable storage media and can be loaded onto persistent storage 308 via I/O interface(s) 312. I/O interface(s) 312 also connects to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

What is claimed is:

1. A method comprising:
in response to detecting a refuse item crossing an aperture threshold of a refuse collection point included in a refuse container having one or more computing processors, capturing, via the one or more computer processors, an image of the refuse item, the refuse item material type, a date the refuse item crossed the aperture threshold and a time the refuse item crossed the aperture threshold;
capturing, via the one or more computer processors, an image of a depositor of the refuse item; and
reading, via the one or more computer processors, information associated with the depositor of the refuse item from an item having a Wiegand card technology;
transmitting, via the one or more computer processors, the refuse item material type, the date the time, one or more of the image of the refuse item and the image of the depositor of the refuse item.

2. The method of claim 1, wherein the step of transmitting, via the one or more computer processors, the one or more of the image of the refuse item and the image of the depositor of the refuse item includes the use of an ultra-high frequency signal.

3. The method of claim 1, wherein the step of transmitting, via the one or more computer processors, the one or more of the image of the refuse item and the image of the depositor of the refuse item includes the use of a microwave band signal.

4. The method claim 1, further comprising printing, via the one or more computer processors, one or more of the image of the refuse item and the image of the depositor of the refuse item.

5. The method of claim 1, further comprising generating, via the one or more computer processors, analytics for marketing purposes using one or more of the image of the refuse item and the image of the depositor of the refuse item.

6. The method of claim 5, wherein the analytics include information reflective of one or more of a location of the refuse container, a refuse itemID and a refuse depositorID.

7. The method of claim 1, further comprising displaying, via the one or more computer processors, one or more of the image of the refuse item and the image of the depositor of the refuse item.

8. The method of claim 7, wherein the display is a touch screen display.

9. The method of claim 1, further comprising reading, via the one or more computer processors, information associated with the depositor of the refuse item stored in a flash memory.

10. The method of claim 1, wherein the reading, further comprises items having one or more of a barcode, a biometric information, a magnetic strip, an integrated circuit, and a flash memory.

11. The method of claim 1, wherein the refuse item material type comprises at least one of plastic, aluminum, glass or combinations thereof.

* * * * *